United States Patent
Yasuba et al.

(10) Patent No.: US 7,630,017 B2
(45) Date of Patent: Dec. 8, 2009

(54) ON-SCREEN DISPLAY CIRCUIT

(75) Inventors: Takashi Yasuba, Ora-gun (JP); Kenichi Nakajima, Hanyu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 700 days.

(21) Appl. No.: 11/350,732

(22) Filed: Feb. 10, 2006

(65) Prior Publication Data

US 2006/0181646 A1 Aug. 17, 2006

(30) Foreign Application Priority Data

Feb. 14, 2005 (JP) ............................. 2005-036921

(51) Int. Cl.
   *H04N 9/74* (2006.01)
(52) U.S. Cl. ..................................... 348/569
(58) Field of Classification Search ........................ None
   See application file for complete search history.

(56) References Cited

U.S. PATENT DOCUMENTS

| | | | |
|---|---|---|---|
| 6,118,494 A * | 9/2000 | Knox et al. ................. | 348/569 |
| 6,369,858 B1 * | 4/2002 | Lee ............................. | 348/569 |
| 6,529,244 B1 * | 3/2003 | Hrusecky ..................... | 348/453 |
| 6,570,626 B1 * | 5/2003 | Mendenhall et al. ........ | 348/569 |
| 6,587,155 B1 * | 7/2003 | Xue ............................. | 348/595 |
| 7,362,381 B1 * | 4/2008 | Stahl et al. ................... | 348/569 |

* cited by examiner

*Primary Examiner*—Paulos M Natnael
(74) *Attorney, Agent, or Firm*—Oliff & Berridge, PLC

(57) ABSTRACT

The invention relates to a color half tone display for giving a specific hue to a designated region while displaying the original image by a transparent display at the designated region in an on-screen display in a television receiver. A circuit for generating signals of respective colors of RGB by synthesizing a brightness component Y of the original image and chrominance components (R-Y), (G-Y), (B-Y) using an adder 12 is provided with a switch element 10 for restricting an input of the chrominance component to the adder 12. When an I signal designates a half tone display region, the switch element 10 is brought into OFF state based on the I signal. The color half tone display is carried out by attenuating an output signal of the adder 12 by an amplifier 14 for respective signals of RGB, thereafter, shifting a direct current level of a component in accordance with a hue to be added in RGB by a DC shift circuit 16.

6 Claims, 2 Drawing Sheets

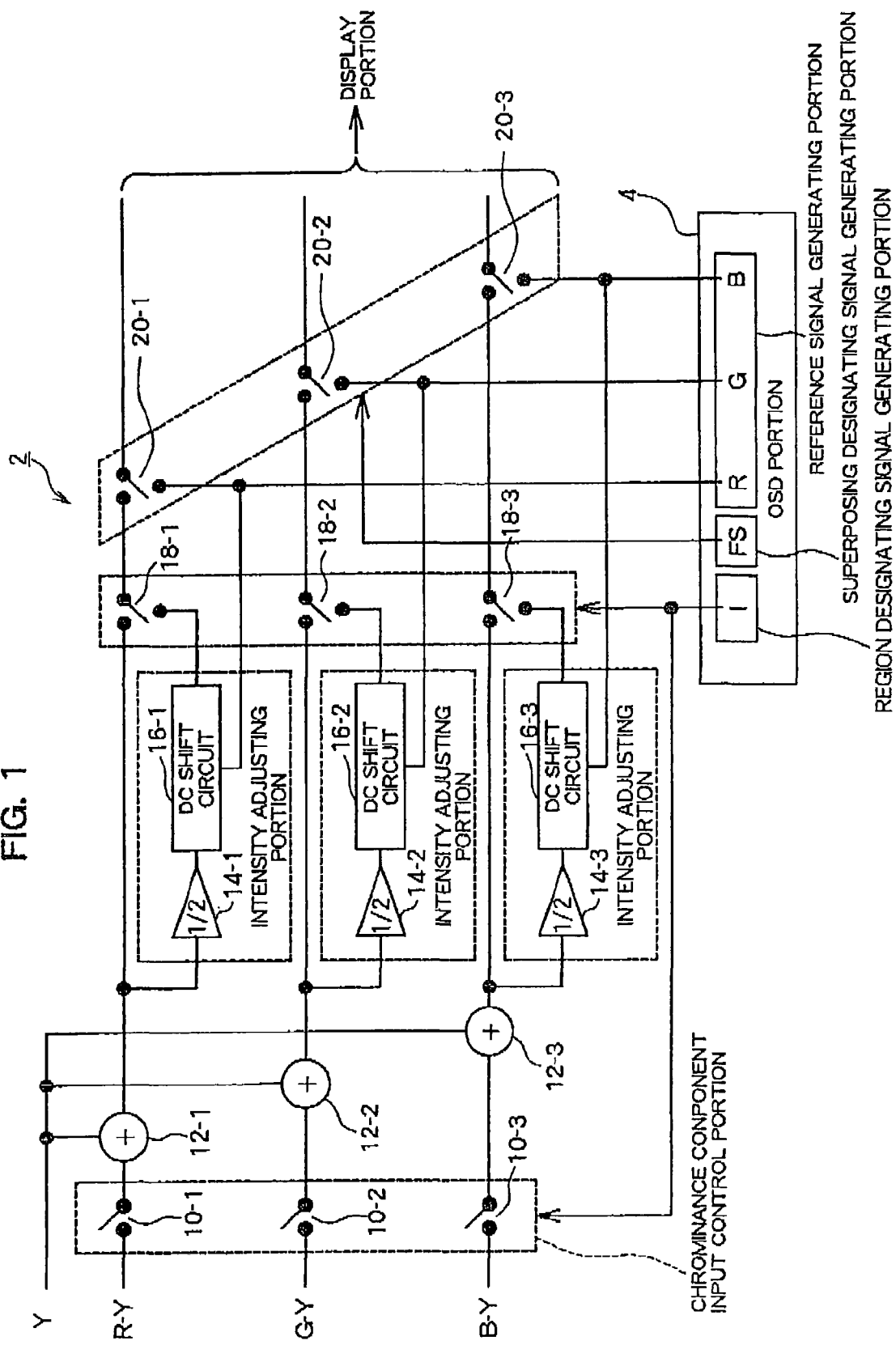

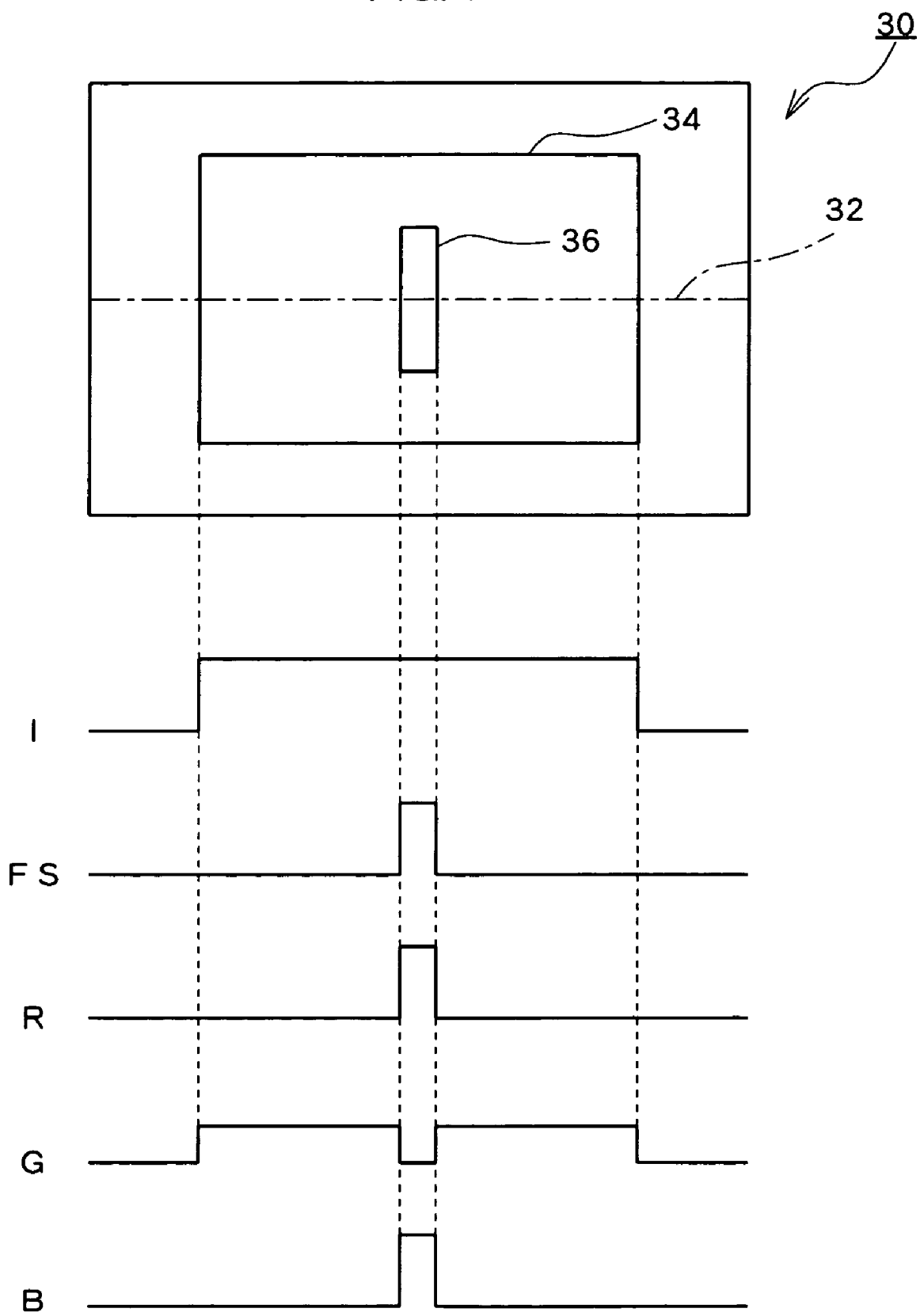

ON-SCREEN DISPLAY CIRCUIT

CROSS-REFERENCE TO RELATED APPLICATIONS

The priority application Number JP2005-036921 upon which this patent application is based is hereby incorporated by reference.

FIELD OF THE INVENTION

The present invention relates to an on-screen display circuit for forming an image superposed on an image display of a television (TV) screen or the like.

BACKGROUND OF THE INVENTION

A function of superposing an image on a screen of a TV image display apparatus to display information with regard to, for example, a channel number, a menu, input switching or the like separately from an inherent TV image (original image) is known as on-screen display (hereinafter, referred to as OSD).

OSD is realized by superposing a display signal from a microcomputer or the like on RGB signals. As one method of OSD, there is known a constitution of displaying a certain designated region on a screen in a uniform color and arranging information displayed by OSD (OSD information) in the designated region by constituting a background thereby. Further, as other method of OSD, OSD is displayed at a designated region through an original image as a background. Further, according to OSD by the transparent display, in order to facilitate seeing OSD information on a screen, the original image at the designated region can be displayed by a half tone display.

As half tone formation in a transparent display of a background art, respective component colors constituting an original image, that is, original image signals of R, G, B respectively are uniformly attenuated at a designated region. Further, in recent years, there is also a case in which by adjusting relative intensities thereof while attenuating original image signals of respective colors of RGB, a half tone display (referred to as a color half tone display) for providing a specific hue to the region is carried out while displaying an original image by a transparent display at a designated region.

According to the color half tone display of the background art, there is a problem in that as a result of changing a balance of RGB of the original image signals constituting a background, depending on a color of the original image or an arrangement thereof, a strange feeling may be given to a person viewing the screen.

SUMMARY OF THE INVENTION

The invention alleviates a strange feeling that may be inflicted on a person looking at a screen due to a background in an on-screen displaying circuit for displaying a designated region by a color half tone.

According to the invention, there is provided an on-screen display circuit for generating a processed image through which an original image is displayed as a background at a designated region, the on-screen display circuit comprising a region designating signal generating portion for generating a region indicating signal indicating a signal time period in correspondence with the designated region, and an image signal processing portion for generating chrominance-removed image signals by removing chrominance components from an original image signal for respective component colors of the image in accordance with the region designating signal and generating a processed image signal for the respective component colors based on the chrominance-removed image signals.

For example, in an image constituted by three colors of RGB as component colors, respective original image signals of RGB are constituted by sums of a brightness component Y and chrominance components (R-Y, G-Y, B-Y) in correspondence with the component colors. According to the invention, chrominance-removed image signals are generated for respective original signals of RGB. The generated chrominance-removed image signals are in correspondence with the brightness component Y for respective signals of RGB. By using the signals, an image having changed brightness but unchanged hue is displayed in a designated region as a background.

BRIEF DESCRIPTION OF THE DRAWINGS

FIG. 1 is a block diagram showing an outline constitution of an on-screen display circuit according to an embodiment; and FIG. 2 is an explanatory view for explaining operation of the on-screen display circuit according to the embodiment.

DESCRIPTION OF THE PREFERRED EMBODIMENT

An explanation will be given in the following of a mode for carrying out the invention (hereinafter, referred to as embodiment) with reference to the drawings.

In a color television system, a transmitting side converts image signals of respective components of R, G, B acquired from an object by an image taking apparatus into a composite signal multiplexed with a brightness signal Y and chrominance signals, and transmits to a transmission path. A receiver receiving the multiplexed signal executes processing of separating the signal to reconstruct RGB signals and displays an image on a display portion by using the RGB signals provided by the processing. The receiver separates the brightness signal Y and the chromatic signals from the composite signal by using a filter circuit, and thereafter further separates R-Y and B-Y by homodyne detection using a color burst signal. Three chrominance signals of (R-Y), (G-Y), (B-Y) are generated by a matrix operation based on R-Y, B-Y reproduced in this way. Image signals of respective components of R, G, B are provided by synthesizing the chrominance signals in correspondence with the respective colors with the Y signal.

FIG. 1 is a block diagram showing an outline constitution of an on-screen display circuit according to the embodiment. The circuit is inputted with the Y signal and the (R-Y) signal, the (G-Y) signal, and the (B-Y) signal generated by a matrix circuit as original image signals and generates the RGB signals subjected to processing for on-screen display to output to a display portion, not illustrated.

The on-screen display circuit is constituted by including an image signal processing portion 2 for processing the image signals and an OSD portion 4 for controlling operation of the image signal processing portion or the like.

The image signal processing portion 2 is provided with similar circuits for the respective colors of RGB. A circuit for generating the R signal is constituted by a switch element 10-1, an adder 12-1, an amplifier 14-1, a DC shift circuit 16-1, and selector circuits 18-1, 20-1. A circuit for generating the G signal is constituted by including a switch element 10-2, an adder 12-2, an amplifier 14-2, a DC shift circuit 16-2, and selector circuits 18-2, 20-2. A circuit for generating the B signal is constituted by a switch element 10-3, an adder 12-3, an amplifier 14-3, a DC shift circuit 16-3, selector circuits 18-3, 20-3. Further, the OSD portion 4 is constituted as, for example, a portion of a microcomputer for controlling respective portions of a receiver or the like.

For example, the circuit for generating the R signal adds to synthesize the chrominance component (R-Y) and the brightness component Y at the adder 12-1. Here, a chrominance component input terminal of the adder 12-1 is connected with the switch element 10-1 to enable to selectively input the chrominance component to the adder 12-1. The switch element 10-1 is supplied with an I signal from the OSD portion 4 as a control signal to switch in accordance with the I signal as mentioned later.

An output of the adder 12-1 is branched to two routes, one route being directly inputted to the selector circuit 18-1. Further, the other branched route is connected in series with the amplifier 14-1 and the DC shift circuit 16-1, and an output of the DC shift circuit 16-1 is supplied to the selector circuit 18-1.

The amplifier 14-1 adjusts a gain of an inputted signal and outputs a resultant signal. Here, the amplifier 14-1 is used as an attenuator for attenuating a signal, for example, for making a level of the inputted signal ½ to output.

The DC shift circuit 16-1 is a circuit for shifting a direct current level of a signal inputted from the amplifier 14-1 to raise the level of the direct current level by a signal level in accordance with an R signal outputted from the OSD portion 4.

The selector circuit 18-1 selectively outputs either of the signal directly inputted from the adder 12-1 or a signal inputted from the DC shift circuit 16-1. The selector circuit 18-1 is supplied with the I signal common to that of the switch element 10-1 from the OSD portion 4 and selects either of the two inputs in accordance with the I signal as mentioned later.

The selector circuit 20-1 selectively outputs either of an output of the selector circuit 18-1 or the R signal (reference signal) at a predetermined level outputted from the OSD portion 4. The selector circuit 20-1 is supplied with an FS signal from the OSD portion 4 and selects either of the two inputs in accordance with the FS signal as mentioned later.

Although the constitution of the circuits for generating the R signal has been described, the constitutions of circuits for generating the G signal, the B signal are also basically similar. Incidentally, a main point of the circuits for generating the G signal and the B signal which differs from the circuit for generating the R signal resides in that respective DC shift circuits 16-2, 16-3 shift direct current levels based on the G signal and the B signal outputted from the OSD portion 4, and that respective selector circuits 20-2, 20-3 are inputted with the G signal and the B signal outputted from the OSD portion 4 at one input end thereof.

FIG. 2 is an explanatory view for explaining operation of the on-screen display circuit, the drawing showing a schematic view of a screen 30 including OSD and output levels of respective signals of I, FS, R, G, B from the OSD portion 4 in a time period in correspondence with a scanning line 32 constituting the screen 30.

The screen 30 is designated with a half tone display region 34 in a rectangular shape, the inside of which is arranged with an OSD information region 36 in a vertically prolonged rectangular shape as the image schematically showing OSD information. Here, an explanation will be given of an example in which the half tone display region 34 is displayed with an image displaying an original image by transparent display and given a hue of a green color (G) and the OSD information region 36 is uniformly displayed by a magenta color mixed with a red color (R) and a blue color (B).

The I signal is a region designating signal for designating the half tone display region 34 and made to be at H (High) level in a signal time period in correspondence with the half tone display region 34, and L (Low) level in a signal time period in correspondence with the other region. Further, the FS signal is a superposing designating signal for designating the OSD information region 36 for superposing OSD information on a background designated at the inside of the half tone display region 34 to mask the background and made to be at H level in a signal time period in correspondence with the OSD information region 36 and at L level in a signal time period in correspondence with the other region.

Outside of the half tone display region 34, both of the I signal and the FS signal are made to be at L level. In this case, the respective switch elements 10 are set to ON state in correspondence with the fact that the I signal is at L level. Further, the respective selector circuits 18 are set so as to select and output the signals directly inputted from the adders 12 in correspondence with the fact that the I signal is at L level. Further, in correspondence with the fact that the FS signal is at L level, the respective selector circuits 20 are set so as to select to output signals from the selector circuits 18. As a result of setting the switch elements 10 and the selector circuits 18, 20 in this way, the respective signals of R, G, B generated by adding to synthesize Y and (R-Y), (G-Y), (B-Y) are outputted to a display portion.

On an inner side of the half tone display region 34 and on an outer side of the OSD information region 36, the I signal is made to be at H level, and the FS signal is made to be at L level. In this case, in correspondence with the fact that the I signal is at H level, the respective switch elements 10 are set to the OFF state, and further, the respective selector circuits 18 are set so as to select to output signals from the DC shift circuits 16. On the other hand, in correspondence with the fact that the FS signal is at L level, the respective selector circuits 20 are set so as to select to output signals from the selector circuits 18.

In this state, the switch elements 10 are made to be in the OFF state and therefore, the adders 12 are not inputted with (R-Y), (G-Y), (B-Y) and the Y component signal is outputted from the respective adders 12. The respective amplifiers 14 make the Y signal outputted from the adders 12 at, for example, ½ level to output to the succeeding DC shift circuits 16.

In accordance with the fact that the I signal is made to be at H level, the FS signal is made to be at L level, and the OSD portion 4 outputs respective signals of R, G, B in accordance with a color provided to the half tone display region 34. Here, in correspondence with providing a light green color, the OSD portion 4 outputs the G signal at a middle level Δg, and on the other hand, sets outputs of the R signal and the B signal to 0. The DC shift circuits 16 are inputted with the R, G, B signals from the OSD portion 4 and add the respective signals to input signals from the amplifiers 14 to output to the selector circuits 18. In this example, output signal levels of the DC shift circuits 16-1, 16-3 are respectively Y/2, and outputs of the DC shift circuits 16-1, 16-3 are respectively made to be an R signal output, and a B signal output from the image signal processing portion 2. Further, an output signal level of the DC shift circuit 16-2 is Y/2+Δg and an output of the DC shift circuit 16-2 is made to be a G signal output from the image signal processing portion 2.

A background image of the half tone display region 34 generated in this way becomes an image of an original image which is formed into a black and white image having contrast reduced to ½" with a hue of a green color having a strength in accordance with Δg. The image is generated by using chrominance-removed image signals which are removed chrominance components of respective colors by bringing the respective switch elements 10 into OFF state and therefore, even when attached with the green color, a change in a hue is restrained inside of the background image and viewability is promoted.

On the inner side of the OSD information region 36, both of the I signal and the FS signal are made to be at H level. In correspondence with the fact that the FS signal is at H level, the respective selector circuits 20 select outputs of R, G, B signals of the OSD portion 4 to constitute respective signal outputs of R, G, B from the image signal processing portion 2. In cooperation with making the FS level at H level, the OSD portion 4 outputs respective signals of R, G, B in correspondence with a color attached to the OSD information region 36. Here, in correspondence with the fact that magenta color is attached to the OSD information region 36, the OSD portion 4 outputs predetermined levels of signals as the R signal and the B signal, and on the other hand, sets the output level of the G signal to 0.

An explanation has been given of operation of the on-screen display circuit. In the above-described circuit, inputs of the chrominance component signals to the adders 12 are restrained by putting the switch elements 10 into the OFF state. That is, the switch elements 10 are provided with a function as chrominance component input control portions for restraining inputs of chrominance component signals to the adders 12. Here, the chrominance component input control portions can also be realized by another constitution. For example, according to a receiver having a gain control circuit or a volume control circuit for controlling intensities of respective chrominance components, it is possible to adopt a constitution in which when the I signal is at H level, intensities of chrominance components respectively in correspondence with RGB are made to be 0. Further, a color killer circuit can also be utilized as a chrominance component input control portion. According to the constitution, chrominance components can be prevented from being generated by making the color killer circuit ON and stopping a color decoding circuit when the I signal is at H level.

The above-described on-screen display circuit according to the invention generates a processed image through which the original image is displayed as the background at the designated region, and is provided with the OSD portion 4 constituting a region designating signal generating portion for generating a region designating signal indicating a signal time period in correspondence with the designated region, and the image signal processing portion 2 for generating the chrominance-removed image signals by removing chrominance components from the original image signal for respective component colors of the image in accordance with the region designating signal and generating processed image signals for the respective component colors based on the chrominance-removed image signals.

For example, in an image constituted by three colors of RGB as component colors, respective original image signals of RGB are constituted by sums of the brightness component Y and chrominance components (R-Y, G-Y, B-Y) in correspondence with the component colors. According to the above-described on-screen display circuit according to the invention, the chrominance-removed image signals removed chrominance components are generated for respective signals of RGB. The generated chrominance-removed image signals are in correspondence with the brightness component Y for respective signals of RGB. By using the signals, an image in which brightness is changed but the hue is not changed is displayed as the background in the designated region.

The image signal processing portion can be provided with an intensity adjusting portion capable of individually setting intensities of the chrominance-removed image signals for the respective component colors. According to the on-screen display circuit of the embodiment, the intensity adjusting portion is constituted by an attenuator for uniformly attenuating gains of the chrominance-removed image signals of the respective component colors and a level shifter connected in series with the attenuator and capable of individually setting offset levels of the chrominance-removed image signals for the respective component colors.

Further, the on-screen display circuit according to the invention includes a superposing designating signal generating portion for generating a superposing designating signal indicating a signal time period of carrying out superposing in accordance with a superposed image superposed on the background in the designated region for selectively masking the background, and a reference signal generating portion for generating a reference signal for the respective component colors. Further, the image signal processing portion further includes a selector for selectively outputting either of the chrominance-removed image signal or the reference signal based on the superposing designating signal.

The image signal processing portion can be constructed by a constitution including the adders for generating the original image signals for the respective component colors by adding to synthesize the brightness component of the original image and the chrominance components of the original image for the respective component colors and the chrominance component input control portion for restraining inputs of the chrominance components to the adder in accordance with the region designating signal for generating the chrominance-removed image signals. According to the on-screen display circuit of the embodiment, the chrominance component input control portion is constituted by the switch circuits 10 for controlling connection between input sources of the chrominance components and the adders 12.

In the above-described constitution, the chrominance component input control portion can be constructed by a constitution including the gain control circuit for controlling gains of the chrominance components in accordance with the region designating signal.

Further, in the above-described constitution, the chrominance component input control portion can be constructed by a constitution including the color killer circuit operated in accordance with the region designating signal.

According to the invention, by using the chrominance-removed image signal removed the chrominance component from the original image signal, the background in which the hue remains unchanged is displayed in the designating region. Therefore, a strange feeling brought about in accordance with a color or the arrangement of the original image can be avoided.

What is claimed is:

1. An on-screen display circuit for generating a processed image through which an original image is displayed as a background at a designated region, the on-screen display circuit comprising:

a region designating signal generating portion for generating a region indicating signal indicating a signal time period in correspondence with the designated region; and an image signal processing portion for generating chrominance-removed image signals by removing chrominance components from an original image signal for respective component colors of the image and generating a processed image signal for the respective component colors based on the chrominance-removed image signals, in accordance with the region designating signal wherein the image signal processing portion includes an intensity adjusting portion capable of individually setting intensities of the chrominance-removed image signals for the respective component colors wherein the intensity adjusting portion comprises:

an attenuator for uniformly attenuating gains of the chrominance-removed image signals for the respective component colors; and a level shifter connected in series with the attenuator and capable of individually setting offset levels of the chrominance-removed image signals for the respective component colors.

2. An on-screen display circuit for generating a processed image through which an original image is displayed as a background at a designated region, the on-screen display circuit comprising:

a region designating signal generating portion for generating a region indicating signal indicating a signal time period in correspondence with the designated region; and an image signal processing portion for generating chrominance-removed image signals by removing chrominance components from an original image signal for respective component colors of the image and generating a processed image signal for the respective component colors based on the chrominance-removed image signals, in accordance with the region designating signal; and a superposing designating signal generating portion for generating a superposing designating signal indicating a signal time period for executing superposing in accordance with a superposed image superposed on the background for selectively masking the background in the designated region; and a reference signal generating portion for generating reference signals for the respective component colors;

wherein the image signal processing portion includes a selector for selectively outputting either of the chrominance-removed image signal or the reference signal based on the superposing designating signal.

3. An on-screen display circuit for generating a processed image through which an original image is displayed as a background at a designated region, the on-screen display circuit comprising:

a region designating signal generating portion for generating a region indicating signal indicating a signal time period in correspondence with the designated region; and an image signal processing portion for generating chrominance-removed image signals by removing chrominance components from an original image signal for respective component colors of the image and generating a processed image signal for the respective component colors based on the chrominance-removed image signals, in accordance with the region designating signal, wherein the image signal processing portion comprises:

an adder for generating the original image signals for the respective component colors by adding to synthesize a brightness component of the original image signal and the chrominance components of the original signal for the respective component colors; and a chrominance component input control portion for restraining an input of the chrominance component to the adder in accordance with the region designating signal;

and wherein the image signal processing portion generates the chrominance-removed image signal.

4. The on-screen display circuit according to claim 3, wherein the chrominance component input control portion includes a switch circuit for controlling connection between an input source of the chrominance component and the adder in accordance with the region designating signal.

5. The on-screen display circuit according to claim 3, wherein the chrominance component input control portion includes a gain control circuit for controlling a gain of the chrominance component in accordance with the region designating signal.

6. The on-screen display circuit according to claim 3, wherein the chrominance component input control portion includes a color killer circuit operated in accordance with the region designating signal.

* * * * *